July 16, 1929.  W. OWEN  1,720,745
APPARATUS FOR MAKING PLATE GLASS
Filed Dec. 14, 1927    7 Sheets-Sheet 4

INVENTOR
Wm Owen
by James C Bradley
atty

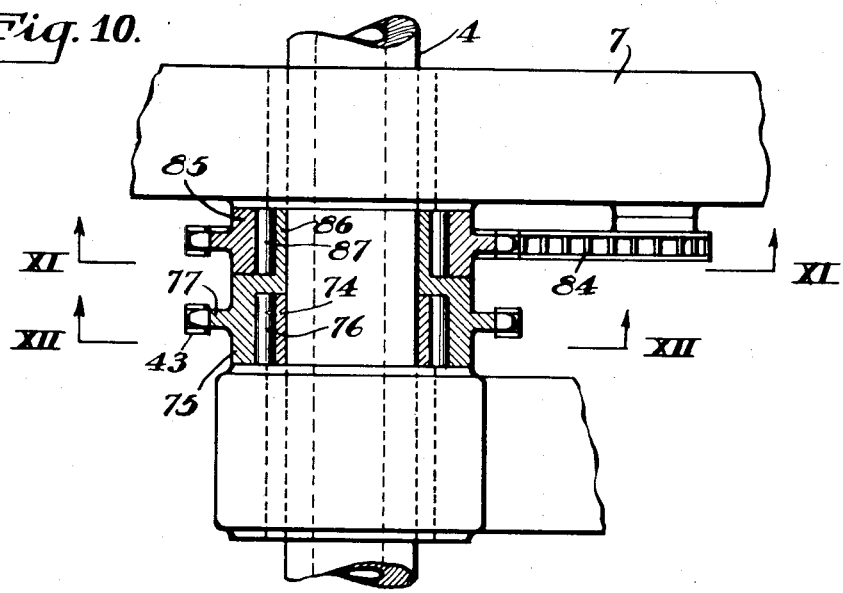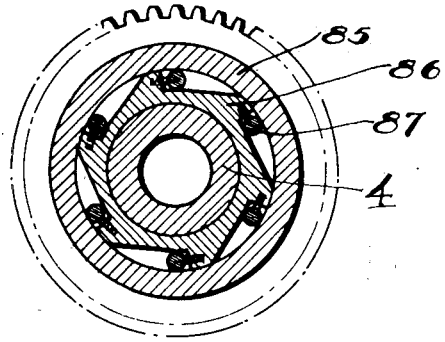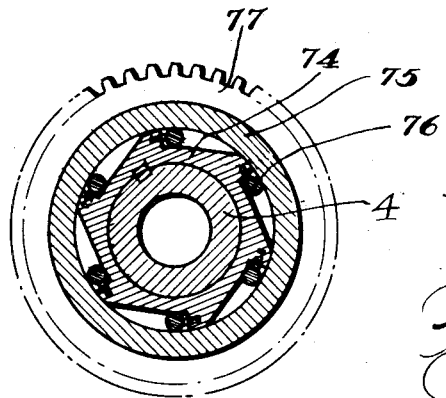

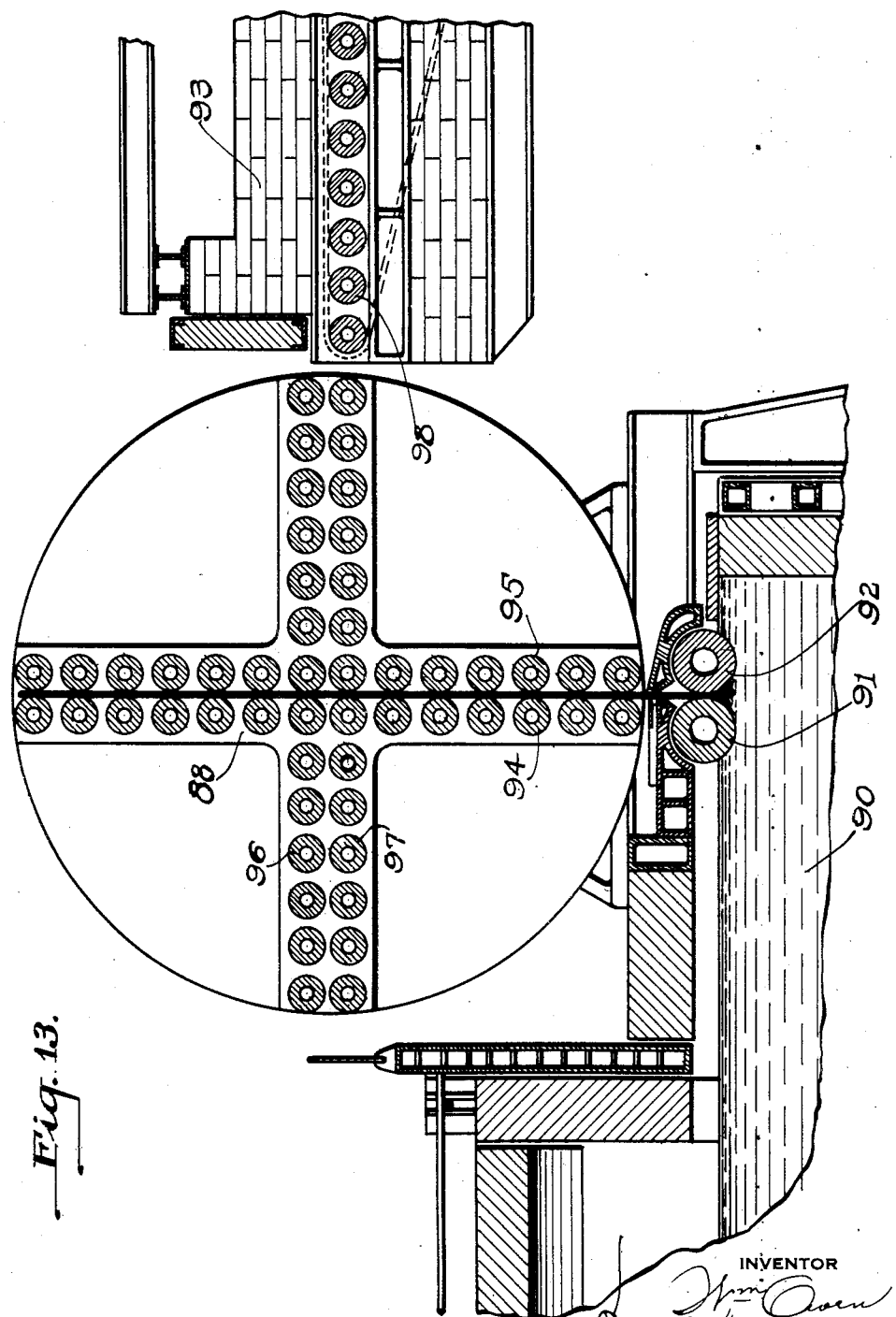

Patented July 16, 1929.

1,720,745

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

APPARATUS FOR MAKING PLATE GLASS.

Application filed December 14, 1927. Serial No. 239,921.

Figure 1:
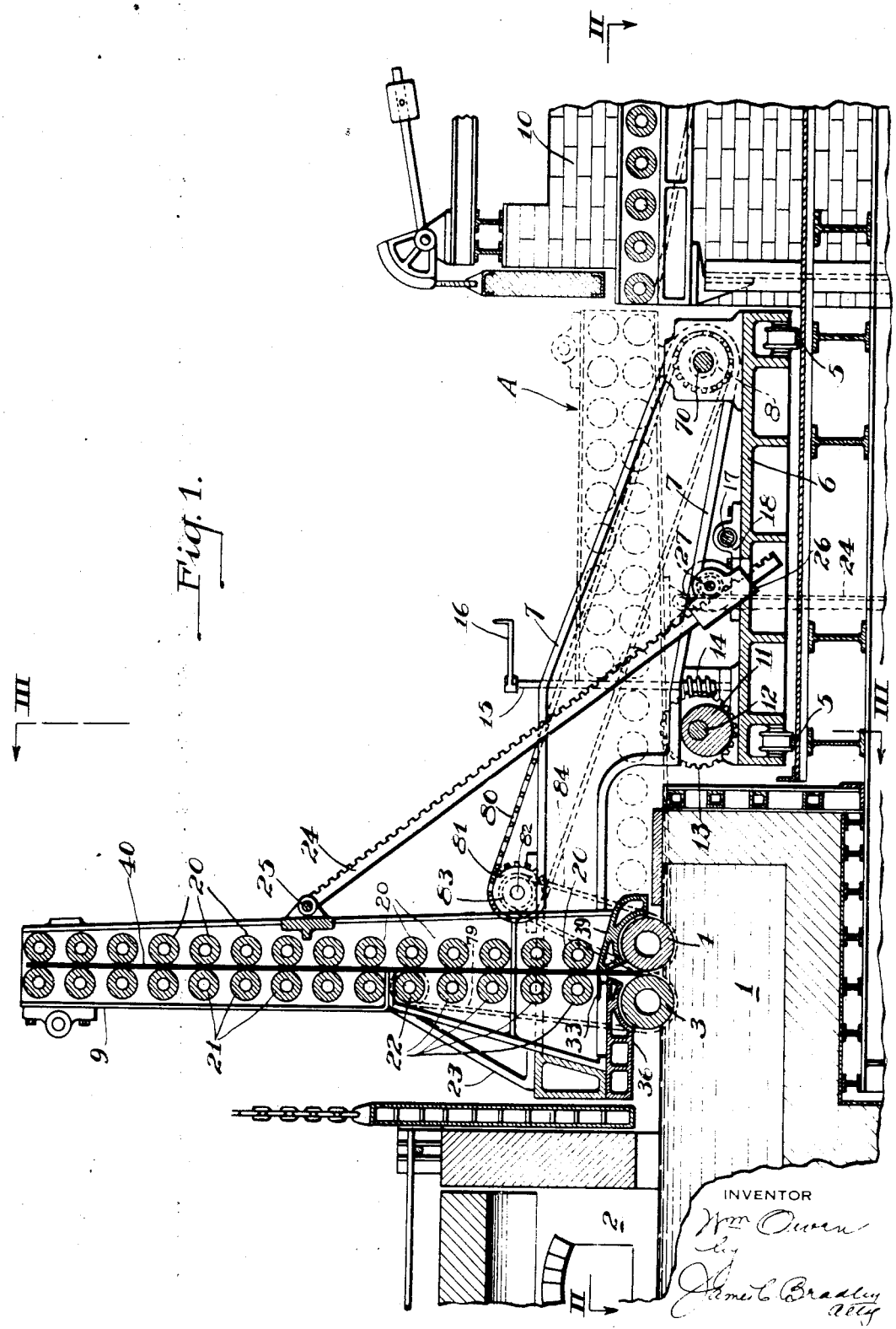
Figure 2:
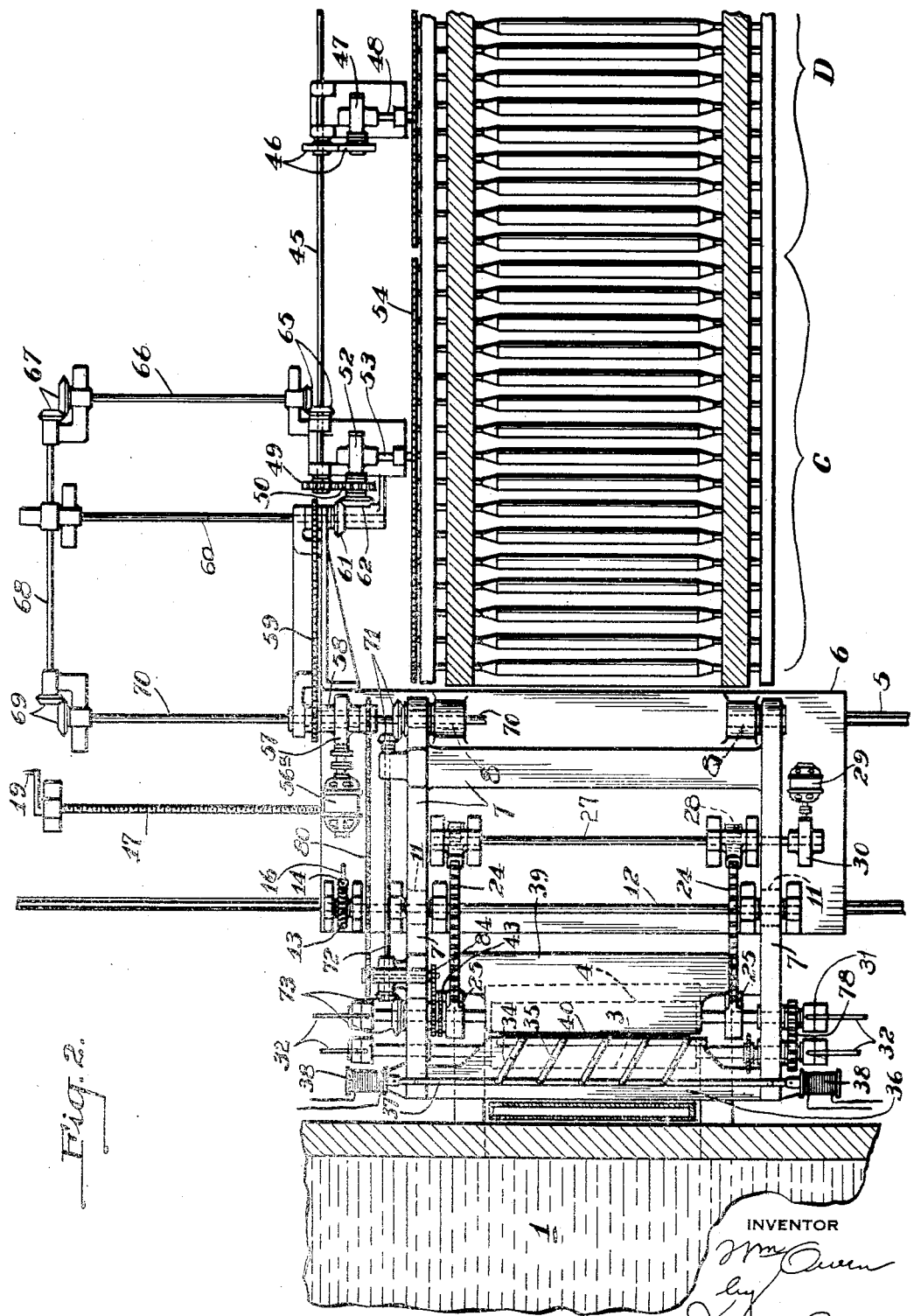
Figure 3:
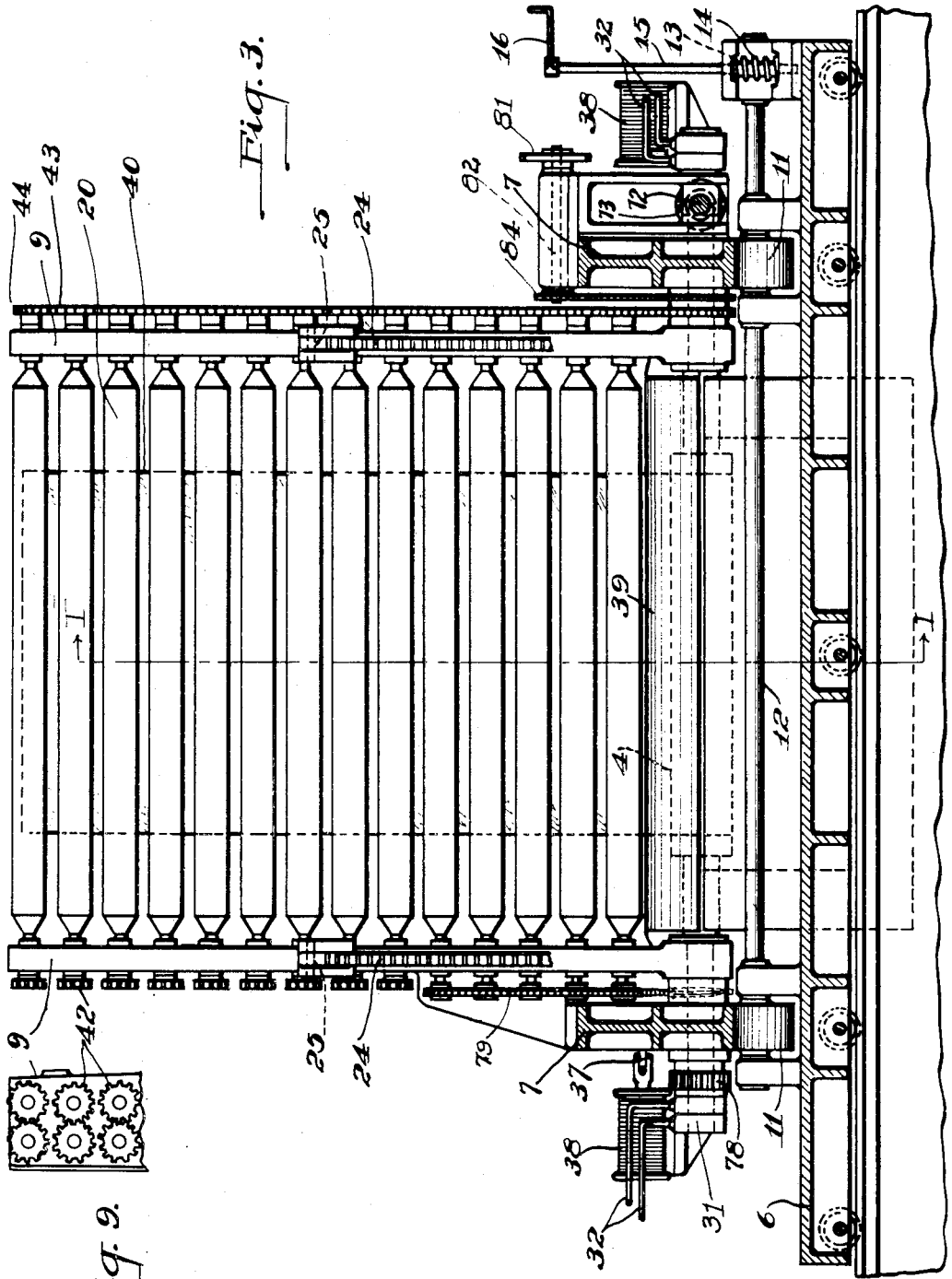
Figure 4:
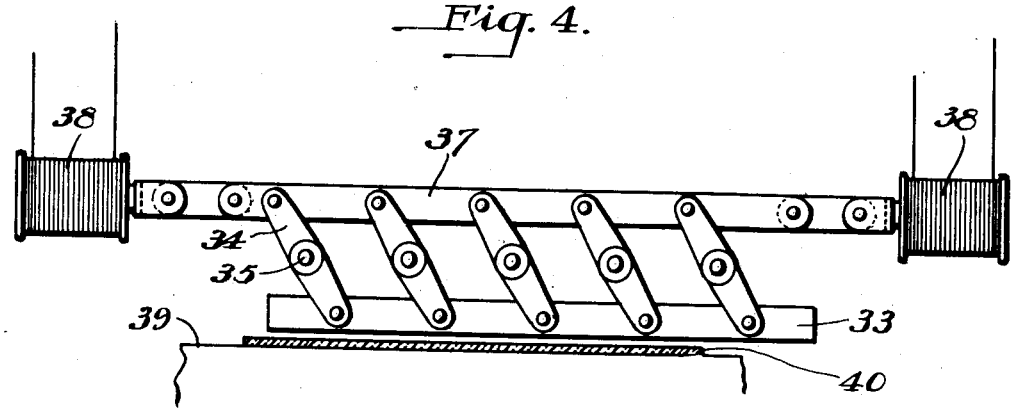
Figure 5:
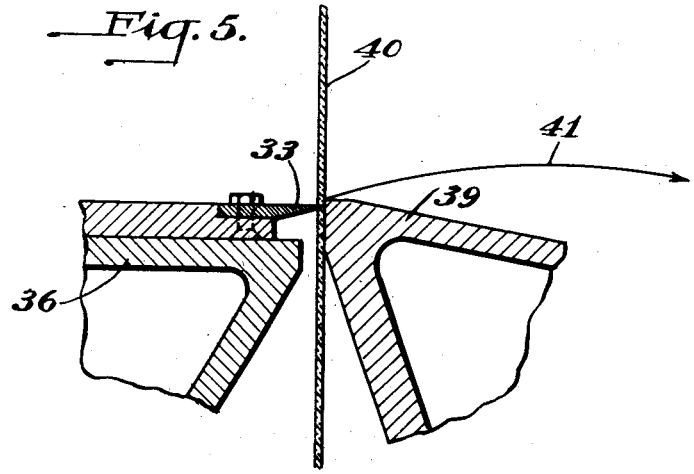
Figure 6:
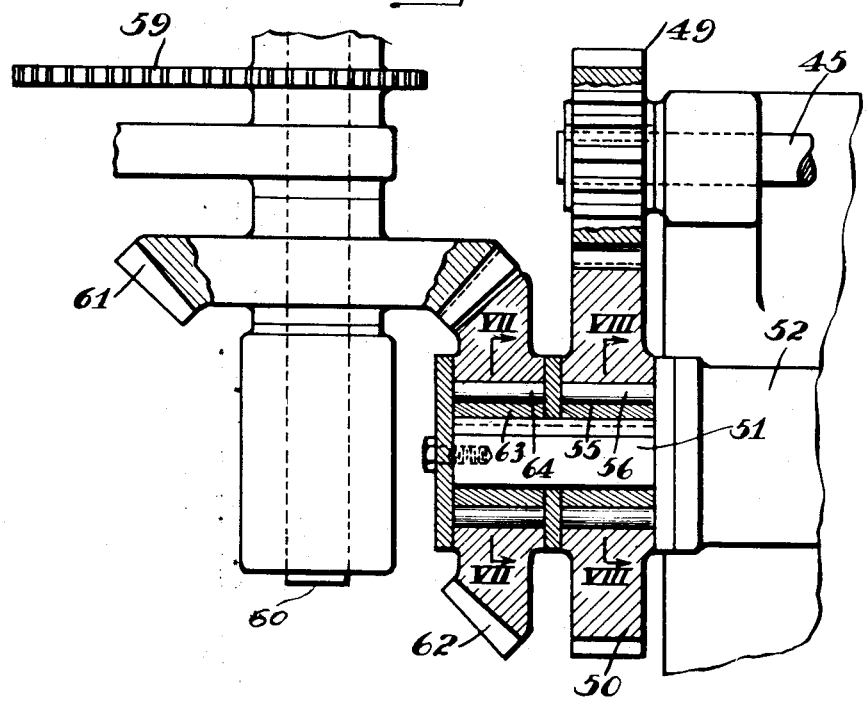
Figure 7:
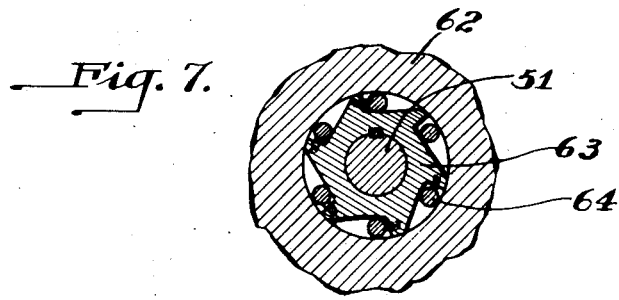
Figure 8:
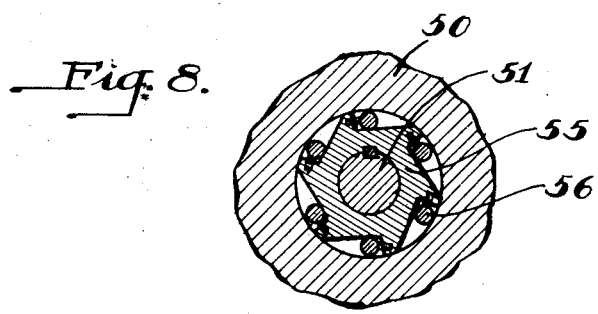

The invention relates to apparatus for making plate glass continuously from a glass bath, cutting it into sections and delivering it to a leer. It has for its primary objects the provision of improved means for accomplishing the functions above specified, which shall be of simple construction; which can be operated without loss of time in getting the glass into the leer, and which can be operated with a minimum loss due to breakage. Certain embodiments of the invention are illustrated in the accompanying drawings, wherein:

Figure 1 is a section on the line I—I of Fig. 3. Fig. 2 is a section on the line II—II of Fig. 1. Fig. 3 is a section on the line III—III of Fig. 1. Figs. 4 and 5 are detail sections on an enlarged scale of the cutting off device, Fig. 4 being a plan view, and Fig. 5 a vertical section. Figs. 6, 7 and 8 are detail views showing a part of the driving mechanism, Fig. 6 being a horizontal section, while Figs. 7 and 8 are sections on the lines VII—VII and VIII—VIII respectively of Fig. 6. Fig. 9 is a partial side elevation of the side of the take down frame. Figs. 10, 11 and 12 are detail sectional views of another part of the driving mechanism, Fig. 10 being a horizontal section, and Figs. 11 and 12 being vertical sections on the lines XI—XI and XII—XII respectively of Fig. 10. And Fig. 13 is a vertical section showing a modification.

Referring to the general arrangement, as shown in Figs. 1, 2 and 3, 1 is a drawing tank or forehearth communicating with the melting tank 2, preferably of the regenerator type; and 3 and 4 are driven water cooled rolls having their lower sides immersed in the glass bath and adapted to form and size a continuous glass sheet and deliver it upward into the take-down apparatus. Mounted for lateral movement upon the track 5 is a truck 6, which carries a framework 7 pivoted for tilting movement around the pivots 8, 8 (Fig. 2) and carrying at its forward end the sizing rolls 3 and 4 and the tilting take-down frame 9. The tilting take-down frame is adapted to occupy either the vertical position shown in full lines or the horizontal position marked A, shown in dotted lines in Fig. 1, such frame being mounted for swinging movement about the center of the roll 4. In advance of the take-down frame when in its horizontal position is the roller leer 10.

The framework 7 which carries the rolls 3 and 4, and the tilting take-down frame is adjustable about the pivots 8 by means of a pair of eccentrics 11, 11 carried by the shaft 12 extending transversely of the frame. This shaft has keyed to one end the worm wheel 13, which meshes with the worm 14 on the shaft 15, and such shaft may be rotated by means of a crank 16 carried by the upper end thereof. By adjusting the eccentrics 11, the rolls 3 and 4 may be moved up and down to vary the extent to which these rolls are immersed in the glass bath, and in case it is desired to remove the rolling apparatus from its operative position, the eccentrics may be rotated to such an extent that the rolls 3 and 4 are lifted a considerable distance above the glass. When moved to this upper position, the parts clear the walls of the drawing tank, so that the truck 6 can be moved laterally upon the track 5 to a position out of alignment with the drawing tank and leer. This movement is preferably accomplished by means of the feed screw 17 extending through a nut 18 carried by the framework of the truck and provided with a handle 19 at its end. This screw is swiveled against endwise movement in suitable supports, and by rotating it, the truck 6 may be moved along the track to any desired position.

The take-down frame 9 carries the series of rolls 20 on one side of the glass sheet and the series of rolls 21 on the other side of sheet. Below the rolls 21 is a series of five rolls 22 which oppose the lower five rolls of the series 20. The rolls 22 are mounted in a fixed frame 23, which is supported upon the pivoted frame 7 and always remains in the position shown in Fig. 1. The frame 9 carrying the rolls 20 and 21 is moved from the vertical position shown in full lines to the horizontal position shown in dotted lines by means of the rack bars 24, 24 pivoted to the tilting frame at 25 and having their lower ends extended slidably through the guide members 26. These guide members 26 are swivelled to the truck 6 upon a transverse shaft 27 and this shaft is provided with a pair of pinions 28, which engage the teeth upon the rack bars. The shaft is driven from a motor 29 (Fig. 2) through the intermediary of a worm and worm wheel in the casing 30. After a length of glass is carried up into the frame 9, by the rollers 20, 21 and 22 and cut off adjacent the lower end of the tilting frame, such frame is moved down to the horizontal position shown in dotted lines, and the further rotation of the rolls 20, 21 and 22 carries the sheet into the leer 10, after which the tilting frame is moved back to the position shown in full lines and the operation repeated.

The rolls 3 and 4 are preferably cooled by a circulation of water therethrough, and this is accomplished by means of the usual swivels 31 connected with the water pipes 32. The sheet is cut off above the rolls 3 and 4 after its upper end has reached the top of the take-down frame 9 and this is preferably accomplished by the device shown in detail in Figs. 4 and 5. The blade 33 is carried upon the lever arms 34, each pivoted at 35 to the air cooled casting 36 which forms a part of the closure above the bath. The rear ends of the arms 34 are connected to the bar 37 operated by the solenoids 38. When the bar 37 is moved endwise from the position shown, the blade 33 is brought to the position indicated in Fig. 5, thus severing the sheet. At this time, the edge of the blade comes into opposition to the nose of the casting 39, also air cooled and carried by the framework which carries the take-down frame. When the take-down frame is shifted, the lower edge of the sheet 40, which has been severed, follows the path indicated by the line 41, the path of movement being such that the edge of the glass clears the casting 39. The next severing operation is accomplished by moving the bar 37 in the reverse direction, thus bringing it back to starting position. The solenoids 38 are energized from a suitable current supply which may be completed by a push button operation or may be controlled automatically so that the blade 33 is caused to cut off the sheet at certain definite intervals. The rolls 21 in the take-down frame 9 are rotated from the opposing rolls 20 by means of the gears 42 on the ends of the axles of the two sets of rolls, as indicated in Figs. 3 and 9, and the rolls 20 are driven by means of a chain 43 passing around sprockets 44 on the ends of the axles of the rolls, the chain 43 being driven as hereinafter explained.

When the sheet is passing up between the rolls 20, 21 and 22, it is moved at the relatively slow speed incident to its formation between the rolls 3 and 4. A different speed is required, however, after the sheet is shifted to horizontal position, indicated at A. At this time it is desirable that the sheet should be run rapidly out of the take-down frame and into the leer 10, so that the take-down frame can be gotten back to vertical position again before the sheet has moved upward any great distance above the rolls 3 and 4. During this interim, the sheet is supported on one side only by the rolls 22. Provision is, therefore, made for driving the rolls 20 and 21 at a relatively high speed after the take-down frame reaches horizontal position and at this time it is also necessary to drive the first section of the leer rolls at a relatively high rate of speed corresponding to that of the rolls 20 and 21. After the sheet has been gotten out of the take-down frame and into the leer, the rolls in the first section of the leer can be slowed down to the speed of the rolls in the rest of the leer following. In Fig. 2, the rolls of the set marked C are arranged to be driven at relatively high speed, as above set forth, while the rest of the rolls of the leer indicated by the reference letter D constitute the slow speed portion of the leer. The arrangement for securing the speeds of operation of the various rolls as above set forth will now be described.

The rolls of section D of the leer are driven from the shaft 45, the motor for driving such shaft not being shown, but being located somewhere to the right of the apparatus. This shaft drives the rolls D through the intermediary of the spur gears 46, the worm and worm wheel drive in the casing 47 and sprocket wheels upon the ends of the shafts 48 and the ends of the roll shafts around which a sprocket chain passes in the usual way. The section C of the rolls is driven a part of the time at the same speed as the rolls D by means of the spur gears 49 and 50, the latter of which is carried upon the shaft 51 (Fig. 6), the shaft 51 serving to drive the rolls C through the intermediary of the worm gearing in the casing 52, the shaft 53 and a sprocket chain 54, which passes around a sprocket on the shaft 53 and also around sprockets upon the ends of the roll shafts of section C. As indicated in Figs. 6 and 8, the spur gear 50 drives the shaft 51 through the intermediary of a pin clutch, including the toothed member 55 keyed to the shaft 51 and the pins or rollers 56. This constitutes a one-way clutch device which permits the shaft 51 to be driven by the gear 50 at a relatively slow speed, but at the same time makes it possible to drive the shaft 51 at the relatively higher speed desirable while the sheet is being run from the take-down frame into the leer. The high speed drive of the shaft 51 is accomplished from the motor 56$^a$, which operates through the worm gearing in the casing 57 to rotate a hollow shaft 58 carrying a sprocket around which the chain 59 passes. At its other end, this chain passes around a sprocket on the shaft 60. This shaft 60 carries a bevel gear 61 in driving engagement with the gear 62. As indicated in Fig. 6, the gear 62 has a one way clutch engagement with the shaft 51 through the intermediary of the tooth member 63 and the roller pins 64. The shaft 51 may, therefore, be operated at proper intervals at a relatively high speed from the motor 56ª, such high speed being used when the sheet in the frame, 9 is being run from such frame into the leer.

The high and low speed drive of the rollers 20 and 21 of the take-down frame is also accomplished from the low speed shaft 45 and from the motor 56ª by the use of pin clutches similar to those heretofore described. The low speed drive includes the bevel gears 65 (Fig. 2), the shaft 66, the bevel gears 67, the shaft 68, the bevel gears 69, the shaft 70 passing through the hollow shaft 58, the bevel gears 71, the shaft 72 and the bevel gears 73, one of such gears 73 being carried by the axle of the sizing roll 4 (Figs. 10, 11 and 12). Keyed to the axle of the roller is the toothed clutch member 74 and surrounding this member is the sleeve 75 with the interposed clutch pins 76. This sleeve is provided with a sprocket wheel 77 around which passes the chain 43, heretofore referred to in connection with Fig. 3, as extending around the sprockets on the ends of the rolls 20. The slow speed drive of the rolls 20 is thus provided for, as well as the drive of the rolls 21 which are geared to the rolls 20, as indicated in Fig. 9, and as heretofore described. The roll 3 is driven from the roll 4 by means of the spur gears 78 carried by the ends of the rolls (Fig. 2). The rolls 22 are driven at the same speed as the rolls 20 and 21 by means of a sprocket chain 79 (Figs. 1 and 3) which passes around suitable sprockets on the end of the roll 3 and upon the ends of the rolls 22. The high speed drive of the rolls 20 and 21, for running the sheet out after the take-down reaches horizontal position, is accomplished from the motor 56ª, whose hollow shaft 58 carries a sprocket around which passes the chain 80, such chain at its left hand end extending around the sprocket 81 mounted upon the shaft 82. The shaft 82 has at its inner end a sprocket 83, around which passes a second sprocket chain 84. This sprocket chain extends around a sprocket 85 (Figs. 10, 11 and 12) mounted in driving relation with the sleeve 75 hertofore referred to. The sleeve 75 has, in opposition to the sprocket 85, a toothed portion 86 (Fig. 11) and between this toothed portion and the sprocket 85 are positioned the pins or rollers 87. A slip clutch is thus provided by means of which the sleeve 75 may be driven at a high rate of speed when desired. This high rate of speed is used when the frame 9 has been shifted to horizontal position. At this time, the motor 56ª is started, either automatically or by means of a push button, thus accomplishing the drive of the sleeve 75, and this sleeve 75 operating through the sprocket chain 43 rotates the rolls 20 and 21 at the relatively high speed necessary in order to get the glass sheet out of the take-down frame, so that such take-down frame may be moved back to receiving position before too great a period of time has elapsed. The high speed drive of the rollers in the take-down frame from the motor 56ª at the same time gives the necessary high speed drive for the rollers in the first section C of the leer, as heretofore described. After the sheet of glass is in the leer and upon the set of rollers C, the motor 56ª is stopped, either automatically or by a push button and the slow speed drive is again resumed through the intermediary of the pin clutches, such drive for all of the rolls in the leer and for the rolls in the take-down frame being secured from the slow speed drive shaft 45.

The drive mechanism as heretofore described is all mounted so that it is supported by and moves with the truck 6 and in order to permit of this movement, the shafts 60 and 70 are splined through gears driven thereby at their ends adjacent the leer. It will be noted that the drive shaft 70 and the hollow shaft 58 are concentric with the pivots 8 (Fig. 1) about which the framework carrying the rolls 3 and 4 and the take-down are tilted by means of the eccentrics. The tilting movement of the frame as employed for adjusting purposes does not, therefore, interfere with any of the driving mechanism and the lateral movement of the truck and the parts carried thereby also does not interfere with such driving mechanism, so that the apparatus may be operated when it is moved to one side of the end of the tank, this possibility of operation under these conditions being desirable in tuning up the apparatus preliminary to actual operation.

Fig. 13 illustrates in rough form the modification comprehended by the invention, wherein the frame 88, mounted for rotation about its center is substituted for the tilting frame 9 of Fig. 1. In this construction, the melting tank 89 and drawing tank 90, as well as the sizing rolls 91, 92, are similar to the parts 1, 2, 3 and 4 of the Fig. 1 construction, and the apparatus for handling the glass above the rolls delivers into a leer 93, which is similar to that of the Fig. 1 construction, the same cutting off device being used as in the other construction. The rotating framework 88 is provided with two sets of opposing rolls 94, 95 and 96, 97. After the glass sheet has been cut off, the frame 88 is rotated through an arc of 90 degrees and the glass is run into the leer 93, this rotation bringing the rolls 96, 97 in position to receive the next sheet of glass as it passes upward from the rolls 91 and 92. Suitable means are provided, on the order of those heretofore described, for operating all of the sets of rolls, provision being made for rotating the rolls 94 and 95, and 96 and 97 at two different speeds and also for rotating the first set of rolls 98 in the leer at two different speeds as in the other construction.

What I claim is:

1. The combination with a glass drawing tank, of a pair of sizing rolls above the bath, a tilting take-down frame, movable from a vertical position to a horizontal one, two sets of opposing rolls carried by the frame for receiving the glass sheet which is formed between the sizing rolls and delivered upward thereby, means above the sizing rolls for severing the sheet, a leer in alignment with the take-down frame when it is in its horizontal position, and means for driving said sets of rolls at two different peripheral speeds, one of which corresponds to the peripheral speed of the sizing rolls for use when the take-down frame is in vertical position, and the other of which speeds is substantially greater than the first speed for use in moving the sheet out of the take-down frame, when such frame is in horizontal position for delivering into the leer.

2. The combination with a glass drawing tank, of a pair of sizing rolls above the bath, a tilting take-down frame, movable from a vertical position to a horizontal one, two sets of opposing rolls carried by the frame for receiving the glass sheet which is formed between the sizing rolls and delivered upward thereby, means above the sizing rolls for severing the sheet, a roller leer in alignment with the take-down frame when it is in its horizontal position, means for driving the rolls thereof at a relatively slow speed, means for driving the two sets of rolls in the take-down frame at two different peripheral speeds, one of which corresponds to the peripheral speed of the sizing rolls for use when the take-down frame is in vertical position, and the other of which speeds is substantially greater than the first speed for use in moving the sheet out of the take-down frame when it is in horizontal position, and means whereby the rolls in the entrance portion of the leer are driven at the same peripheral speed as the rolls in the take-down frame when the sheet is being delivered from the take-down frame to the leer.

3. The combination with a glass drawing tank, of a pair of sizing rolls above the bath, a tilting take-down frame, movable from a vertical position to a horizontal one, two sets of opposing rolls carried by the frame for receiving the glass sheet which is formed between the sizing rolls and delivered upward thereby, means above the sizing rolls for severing the sheet, a roller leer in alignment with the take-down frame when it is in its horizontal position, means for driving the rolls thereof at a relatively slow speed, means for driving the two sets of rolls in the take-down frame at two different peripheral speeds, one of which corresponds to the peripheral speed of the sizing rolls for use when the take-down frame is in vertical position, and the other of which speeds is substantially greater than the first speed for use in moving the sheet out of the take-down frame when it is in horizontal position, and means whereby the rolls in the entrance portion of the leer are driven at the same peripheral speed as the rolls in the take-down frame when the sheet is being delivered from the take-down frame to the leer, one-way clutch means being provided in the entrance portion of the leer to permit the driving of the rolls in said entrance portion at the relatively slow speed of the rest of the leer or at the relatively higher speed required when the glass sheet is being delivered thereto from the take-down frame.

4. The combination with a glass drawing tank, of a pair of sizing rolls above the bath, a tilting take-down frame, movable from a vertical position to a horizontal one, two sets of opposing driven rolls carried by the frame for receiving the glass sheet which is formed between the sizing rolls and delivered upward thereby, means above the sizing rolls for severing the sheet, a truck located in front of the drawing tank and movable transversely thereof on which the sizing rolls and take-down frame are carried, means for raising and lowering the sizing rolls on the truck, and a leer in alignment with the take-down frame when it is in its horizontal position.

5. The combination with a glass drawing tank, of a pair of driven sizing rolls above the bath, a series of rolls one above the other in vertical alignment on one side of the pass between the sizing rolls, a tilting take-down frame movable from a vertical position to a horizontal one, a series of rolls carried by the take-down frame in opposition to the other series of rolls, and two sets of opposing rolls carried by said take-down frame, above the two series of rolls with the pass therebetween in alignment with the pass between the two series of rolls, means for driving all of said rolls at the same peripheral speed, and a leer in alignment with the take-down frame when it is in horizontal position.

6. The combination with a glass drawing tank, of a pair of driven sizing rolls above the bath, a series of rolls one above the other in vertical alignment on one side of the pass between the sizing rolls, a tilting take-down frame movable from a vertical position to a horizontal one, a series of rolls carried by the take-down frame in opposition to the other series of rolls, and two sets of opposing rolls carried by said take-down frame, above the two series of rolls with the pass therebetween in alignment with the pass between the two series of rolls, means for driving all of said rolls at the same peripheral speed, a roller leer in alignment with the take-down frame when it is in horizontal position, and a common drive for the sets of rolls in the take-down frame and in the entrance portion of the leer, said drive being adapted to rotate said rolls at a higher rate of peripheral speed than that of the sizing rolls when the take-down frame is in such horizontal position.

7. The combination with a glass drawing tank, of a pair of driven sizing rolls above the bath, a series of rolls one above the other in vertical alignment on one side of the pass between the sizing rolls, a tilting take-down frame movable from a vertical position to a horizontal one, a series of rolls carried by the take-down frame in opposition to the other series of rolls, and two sets of opposing rolls carried by said take-down frame above the two series of rolls with the pass therebetween in alignment with the pass between the two series of rolls, means for driving all of said rolls at the same peripheral speed, a roller leer in alignment with the take-down frame when it is in horizontal position, a common drive for the sets of rolls in the take-down frame and in the entrance portion of the leer, said drive being adapted to rotate said rolls at a higher rate of peripheral speed than that of the sizing rolls, when the take-down frame is in such horizontal position, and other drive means for said rolls in the entrance portion of the leer for driving them at a reduced rate of speed after the operation of said common drive means is discontinued.

In testimony whereof, I have hereunto subscribed my name this 9th day of December, 1927.

WILLIAM OWEN.